(12) United States Patent
Tsuneyoshi et al.

(10) Patent No.: US 7,420,767 B2
(45) Date of Patent: Sep. 2, 2008

(54) RECORDING AND/OR REPRODUCING DEVICE HAVING A POSITIONING ARRANGEMENT FOR FIXING A GRABBER IN PLACE

(75) Inventors: Nobutaka Tsuneyoshi, Kanagawa (JP); Hiromi Inoguchi, Kanagawa (JP); Kouji Kobayashi, Kanagawa (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 364 days.

(21) Appl. No.: 11/158,740

(22) Filed: Jun. 22, 2005

(65) Prior Publication Data

US 2006/0169816 A1 Aug. 3, 2006

(30) Foreign Application Priority Data

Nov. 30, 2004 (JP) ............................ 2004-345411

(51) Int. Cl.
*G11B 15/66* (2006.01)
(52) U.S. Cl. .................. 360/95; 242/332.4; 242/348.2
(58) Field of Classification Search ............... 242/332, 242/332.4, 338.4, 348.2; 226/92; 360/95, 360/96.5, 96.51
See application file for complete search history.

(56) References Cited

U.S. PATENT DOCUMENTS

| | | | |
|---|---|---|---|
| 5,232,180 A | 8/1993 | Hoge et al. | |
| 5,465,187 A * | 11/1995 | Hoge et al. | ................. 360/132 |
| 5,793,563 A * | 8/1998 | Katsuyama et al. | ........... 360/92 |
| 6,322,014 B1 * | 11/2001 | Nemeth | ................... 242/332.4 |
| 6,471,150 B1 * | 10/2002 | Tsuchiya et al. | ......... 242/332.4 |
| 6,644,580 B2 * | 11/2003 | Sasaki et al. | ............. 242/332.4 |
| 6,814,324 B2 * | 11/2004 | Gavit et al. | ............... 242/332.4 |
| 6,902,128 B2 * | 6/2005 | Kuhar | ...................... 242/332.4 |
| 7,195,190 B2 * | 3/2007 | Tsuneyoshi et al. | ...... 242/332.4 |
| 2002/0100831 A1 * | 8/2002 | Sasaki et al. | ............. 242/332.4 |
| 2003/0019968 A1 | 1/2003 | Masuda | |
| 2004/0004142 A1 * | 1/2004 | Gavit et al. | ............... 242/332.4 |
| 2005/0056717 A1 * | 3/2005 | Kuhar | ...................... 242/332.2 |
| 2005/0103913 A1 * | 5/2005 | Aaron et al. | ............. 242/332.4 |

FOREIGN PATENT DOCUMENTS

| | | | |
|---|---|---|---|
| EP | 0 359 394 A2 | | 3/1990 |
| EP | 1098307 A2 | * | 5/2001 |
| EP | 1 453 046 A2 | | 9/2004 |
| JP | 2004171701 A | * | 6/2004 |
| JP | 2004220713 A | * | 8/2004 |
| WO | WO 00/30096 A1 | | 5/2000 |

* cited by examiner

*Primary Examiner*—William J Klimowicz
(74) *Attorney, Agent, or Firm*—Frishauf, Holtz, Goodman & Chick, P.C.

(57) ABSTRACT

A retaining member for retaining a grabber has a positioning arrangement for fixing the grabber in place. The grabber has a rear surface having a pair of hollows at upper and lower end portions. The positioning arrangement has a retainer opposed to a front surface of the grabber on retaining the grabber and a pair of leaf springs opposed to the retainer with a space shorter than a thickness of the grabber. The pair of leaf springs is disposed apart from each other up and down. The pair of leaf springs has a pair of projections engaged with the pair of hollows. The pair of hollows is disposed the outside of a tape winding portion where a magnetic tape is wound.

2 Claims, 7 Drawing Sheets

RECORDING AND/OR REPRODUCING DEVICE HAVING A POSITIONING ARRANGEMENT FOR FIXING A GRABBER IN PLACE

This application claims priority to Japanese Patent Application JP 2004-345411, the disclosure of which is incorporated herein by reference.

BACKGROUND OF THE INVENTION

This invention relates to a recording and/or reproducing device represented by DLT (digital linear tape) or LTO (linear tape open) and, in particular, to a retaining member for retaining a grabber to be coupled to a leader pin.

Recording and/or reproducing devices of the type described are developed for use in back-up ones of computer systems and various types of the recording and/or reproducing devices have been proposed in prior art. Such a recording and/or reproducing device serving as the LTO is disclosed, for example, in the patent document WO 00/30096 A1.

The recording and/or reproducing device may be also a tape drive in which a cartridge having a single reel (a supply reel) can be installed. The cartridge may be also called a cassette. The recording and/or reproducing device contains a take-up reel therein. When the cartridge is installed in the recording and/or reproducing device, a magnetic tape is pulled out of the cartridge and then is wound by the take-up reel through a tape-transport path. The tape-transport path is for guiding the magnetic tape pulled out of the cartridge in a magnetic head. The magnetic head exchanges information between the tape and the magnetic head. In addition, the take-up reel is rotationally drivable by means of a real motor.

In the manner which is disclosed in the above-mentioned patent document WO 00/30096 A1, the cartridge comprises a housing, a rotationally drivable supply reel accommodated in the housing, the magnetic tape wound onto the reel hub of the supply reel, and a coupling element which is connected to the magnetic tape in the area of the free end of the magnetic tape and which is held in a coupling position. The coupling element is also called a leader pin.

In order to enable the magnetic tape contained in the cartridge to be wound onto the take-up reel, the magnetic tape should first be brought to the take-up reel with the aid of the leader pin. For this purpose, the recording and/or reproducing device has a pull-out element. The pull-out element is adopted to be coupled to the leader pin. The pull-out element is also called a grabber.

In order to enable the grabber to be coupled to the leader pin, the recording and/or reproducing device includes retaining means adapted to detachably retain the grabber. The retaining means are movably between a standby position and an operating position. A movement of the retaining means into their operating position causes a movement of the grabber in a coupling direction and the grabber and the leader pin to be coupled. On the other hand, a movement of the retaining means out of their operating position causes a movement of the grabber in a direction opposite to the coupling direction and the grabber and the leader pin to be disengaged.

In order to enable the grabber and the leader pin after they have been coupled (i.e., a pull-out assembly thus formed) to be moved away from the retaining means and to be moved up to the reel hub of the take-up reel, the recording and/or reproducing device includes actuating means. The actuating means is simply formed by a pull-out tape. The pull-out tape is guided along the above-mentioned tape-transport path. The pull-out tape is also called a leader tape.

In the recording and/or reproducing device using such as a leader tape, in order to load the magnetic tape with reliability, it is necessary to pull the magnetic tape out of the cartridge by catching the leader pin received in the cartridge on the grabber with reliability. For the sake of this, it is necessary to put the grabber back in place each time with reliability on catching the leader pin.

In a case of the recording and/or reproducing device using the leader tape, when the magnetic tape is rewound to the supply reel received in the cartridge from the take-up reel, the grabber is pulled by a rotational driving force of the reel motor for rotationally driving the supply reel. For the sake of this, it is difficult to hold the grabber in place stably by only a pulling force of the reel motor.

Accordingly, in the above-mentioned patent document WO 00/30096 A1, latching means are connected to the above-mentioned retaining means, which latching means are movable between a latching position where they can inhibit a disengagement of the grabber from the retaining means and a release position where they enable the grabber to be detached from the retaining means. The latching means have two lever arms which are adopted to cooperate with two latching positions formed by projections of the grabber. Thereby, the grabber is fixed in place.

In a method of fixing (latching) the grabber in place by using the latching means which is different from the retaining means as the above-mentioned conventional recording and/or reproducing device, an additional part is further required to move the lever arms. As a result, the conventional recording and/or reproducing device is disadvantageous in that the number of parts are increased and it results in increase in cost and degradation of reliability.

SUMMARY OF THE INVENTION

It is therefore an object of the present invention to provide a recording and/or reproducing device comprising a retaining member which is capable of fixing a grabber in place with simple in structure.

Other objects of this invention will become clear as the description proceeds.

On describing the gist of an aspect of this invention, it is possible to be understood that a recording and/or reproducing device comprises a grabber to be coupled to a leader pin and a retaining member for retaining the grabber. According to the aspect of this invention, the retaining member comprises a positioning arrangement for fixing the grabber in place.

In the above-mentioned recording and/or reproducing device, the grabber may have a front surface and a rear surface which has a pair of hollows at upper and lower end portions. In this event, the above-mentioned positioning arrangement preferably may comprise a retainer opposed to the front surface of the grabber on retaining the grabber and a pair of leaf springs opposed to the retainer with a space shorter than a thickness of the grabber. The pair of leaf springs is disposed apart from each other up and down. The pair of leaf springs has a pair of projections engaged with the pair of hollows. In addition, the pair of hollows desirably may be disposed the outside of a tape winding portion where a magnetic tape is wound.

On describing the gist of another aspect of this invention, it is possible to be understood that a grabber is for use in a recording and/or reproducing device. The grabber is to be coupled to a leader pin. The grabber comprises a grabber body having a front surface and a rear surface. According to the other aspect of this invention, the rear surface has, at upper and lower end portions, a pair of hollows with which a pair of leaf springs for positioning the grabber is engaged.

In the above-mentioned grabber, the pair of hollows desirably may be disposed the outside of a tape winding portion where a magnetic tape is wound.

DESCRIPTION OF THE PREFERRED EMBODIMENT

Figure 1:
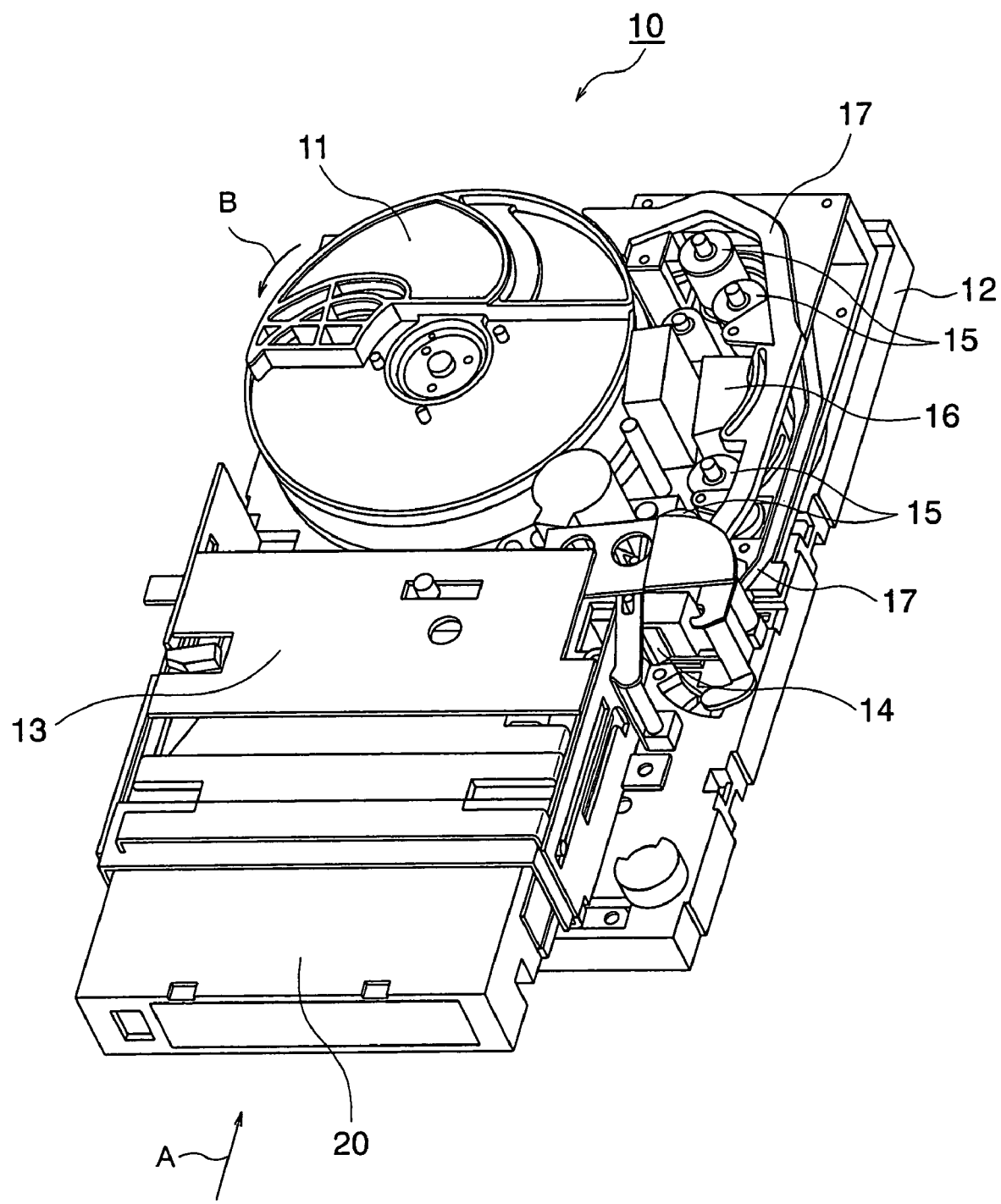
FIG. 1 is a plan view showing a tape drive serving as a recording and/or reproducing device to which this invention is applicable with an upper cover removed therefrom.

Referring to FIG. 1, the description will proceed to a tape drive 10 serving as a recording and/or reproducing device to which this invention is applicable. FIG. 1 is a plan view showing the tape drive 10 with an upper cover removed therefrom.

The tape drive 10 is for receiving a cartridge 20 and contains a take-up reel 11 inside thereof. The take-up reel 11 is also called a spool. The tape drive 10 is generally comprised of a rectangular housing (chassis) 12 that has a common base. The base has first and second spindle motors (reel motors) (not shown). The first spindle motor has the spool (or the take-up reel) 11 permanently mounted on the base of the housing 12 and the spool 11 is dimensioned to accept a relatively high speed streaming magnetic tape (not shown). The second spindle motor (reel motor) is adapted to accept the removable cartridge 20. The removable cartridge 20 is inserted into the tape drive 10 via a lift 13 formed on the housing 12 of the tape drive 10 along an insertion direction depicted at an arrow A.

Upon insertion of the cartridge 20 into the lift 13, the cartridge 20 engages the second spindle motor (the supply reel motor). Prior to rotation of the first and the second spindle motors (reel motors), the cartridge 20 is connected to the permanently mounted spool (the take-up reel) 11 by means of a connection between a grabber 14 and a leader pin (which will later be described). A number of rollers (guide rollers) 15 positioned intermediate the cartridge 20 and the permanent spool 11 guide the magnetic tape as it traverses at relatively high speeds back and forth between the cartridge 20 and the permanently mounted spool 11.

The tape drive 10 further comprises a head actuator assembly 16. The head actuator 16 is located between the take-up spool 11 and the cartridge 20 on a tape-transport path (not shown) defined by the above-mentioned plurality of rollers 15. During operation, the magnetic tape flows forward and backward between the take-up spool 11 and the cartridge 20 and is closely adjacent to the head actuator 16 while the magnetic tape flows on the defined tape-transport path.

In addition, the cartridge 20 has an access opening (not shown) in a right-hand side wall thereof. The access opening can be opened and closed by means of a shutter which is not shown. The shutter is brought automatically in its open position when the cartridge 20 is loaded into the tape drive 10.

Figure 2:
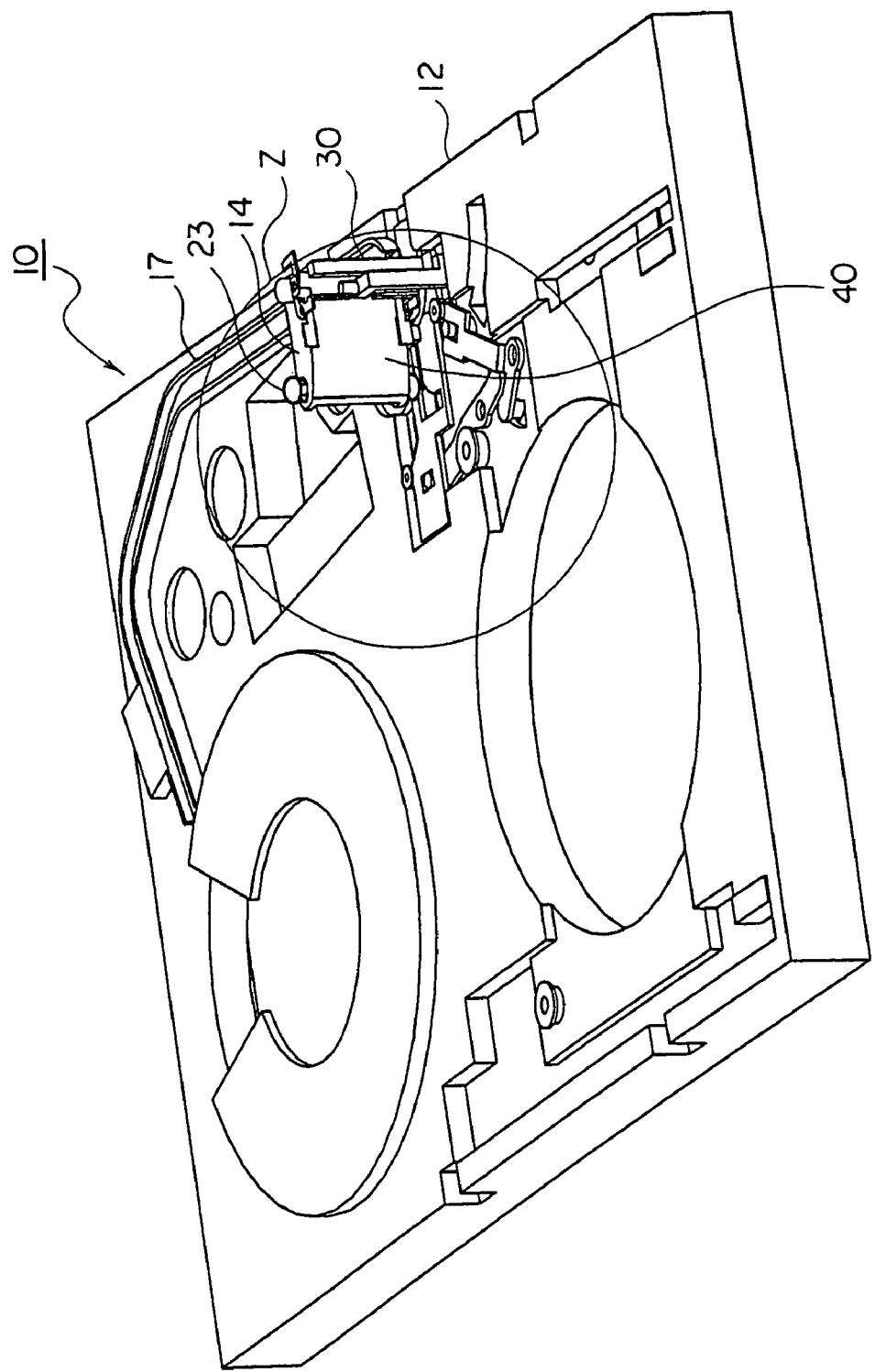
FIG. 2 is a perspective view showing a main portion of the tape drive according to an embodiment of this invention.
Figure 3:
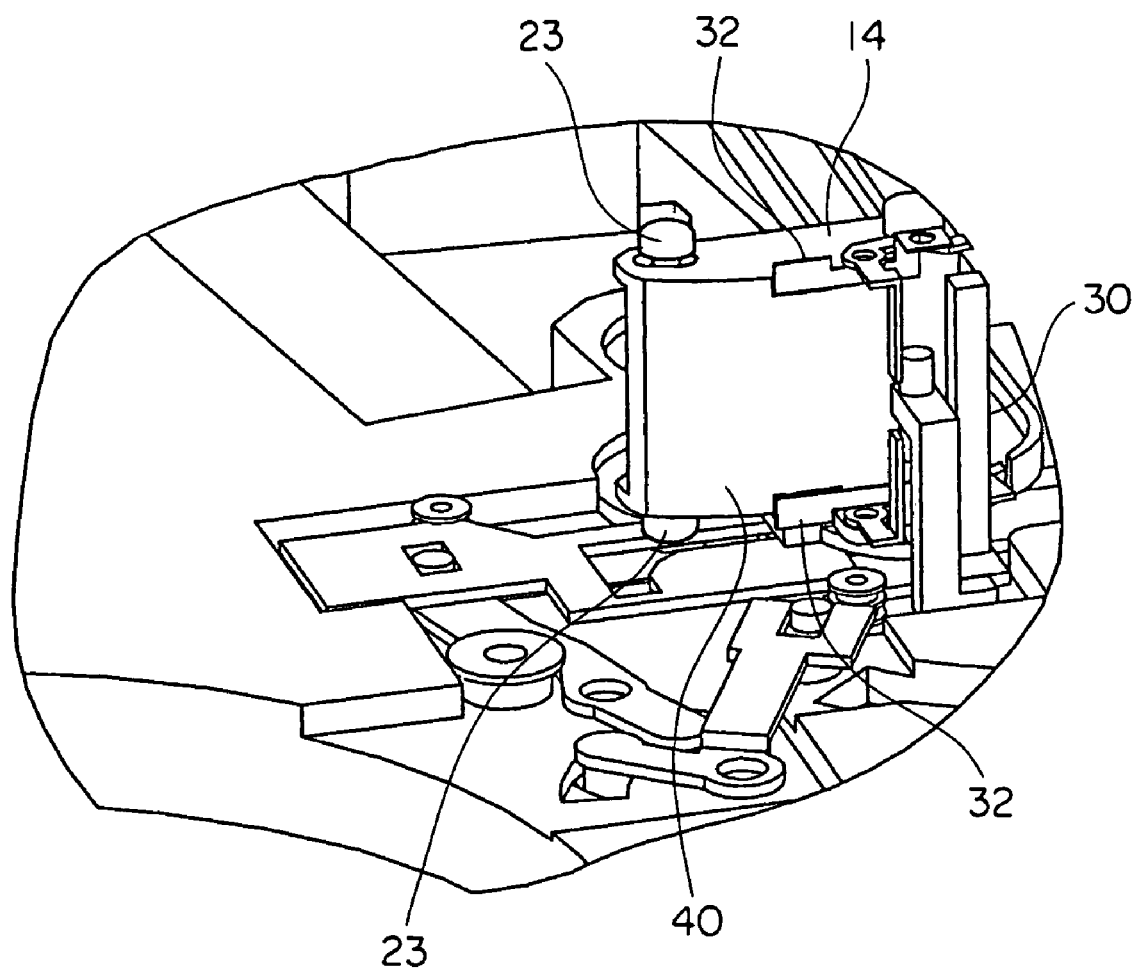
FIG. 3 is a partially enlarged perspective view of a portion of the tape drive encircled in FIG. 2.

Referring to FIGS. 2 and 3 in addition to FIG. 1, the cartridge 20 accommodates a rotationally drivable supply reel (not shown). The cartridge 20 further accommodates a magnetic tape (not shown) wound on a reel hub of the supply reel. The cartridge 20 includes the leader pin 23 connected to the magnetic tape at the free end portion of the magnetic tape. In the cartridge 20, the leader pin 23 is held in a coupling position by means of two positioning forks (not shown).

In addition, in order to enable the grabber 14 to be coupled to the leader pin 23, the tape drive 10 includes a grabber holder (a retaining member) 30 adapted to detachably retain the grabber 14. The grabber holder (retaining member) 30 is rotatably and slidably mounted on the chassis 12.

In order to enable the grabber 14 and the leader pin 23, after they have been coupled, i.e. a pull-out assembly 40 thus formed, to be moved away from the grabber holder (retaining member) 30 and to be moved up to the reel hub of the take-up reel 11, the tape drive 10 includes a leader tape (not shown). The leader tape is guided along the tape-transport path. The tape-transport path is defined by the above-mentioned rollers 15.

The leader tape has one end connected to the grabber 14 and has its other end connected to the reel hub of the take-up reel 11. Thus, by driving the take-up reel 11 in a direction (a taking-up direction) indicated by an arrow B in FIG. 1 by a reel motor (not shown), the pull-out assembly 40 can be moved away from the grabber holder (the retaining member) 30 and up to the reel hub of the take-up reel 11 with the aid of the leader tape. In this event, at the reel hub, the reel hub and the pull-out assembly 40 are brought to each other.

During the movement of the pull-out assembly 40 away from the grabber holder (the retaining member) 30 and towards the reel hub of the take-up reel 11 and also during the movement in the opposite direction, the pull-out assembly 40 should be moved without contact past the rollers 15 and past the magnetic head of the head assembly 16. Therefore, the tape drive 10 comprises a pair of rails 17 which extend essentially adjacent the tape-transport path and which, in the width direction of the magnetic tape, are spaced apart by a distance larger than the width of the magnetic tape.

Figure 4:
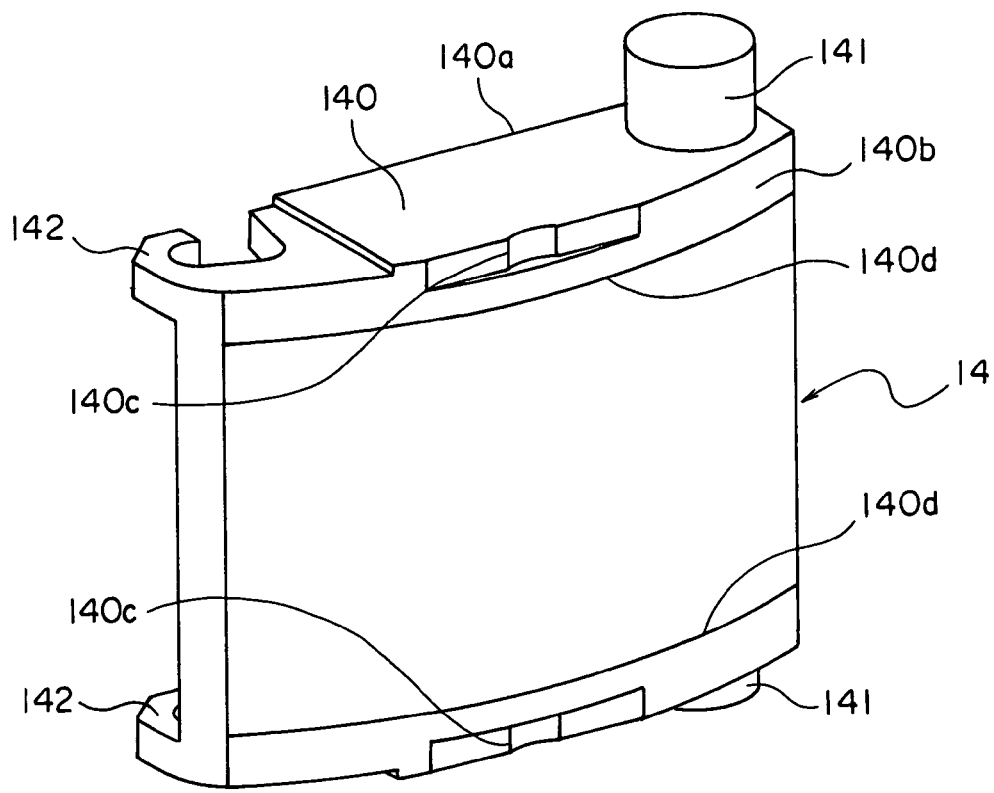
FIG. 4 is a perspective view, obliquely seen from a rear surface side, of a grabber for use in the tape drive to which this invention is applicable.

Referring to FIG. 4, the description will proceed to the grabber 14 to which this invention is applicable. The grabber 14 comprises a grabber body 140 and has a pair of end portions 141 at one side of the grabber body 140. The pair of end portions 141 engages in guide channels of the above-mentioned pair of rails 17. In addition, the grabber 14 has a pair of hook portions 142 at another side of the grabber body 140. The pair of hook portions 142 is for hooking the above-mentioned leader pin 23. The grabber body 140 has a front surface 140a and a rear surface 140b. The rear surface of the grabber 14 has a pair of hollows 140c at upper and lower end portions.

Figure 5:
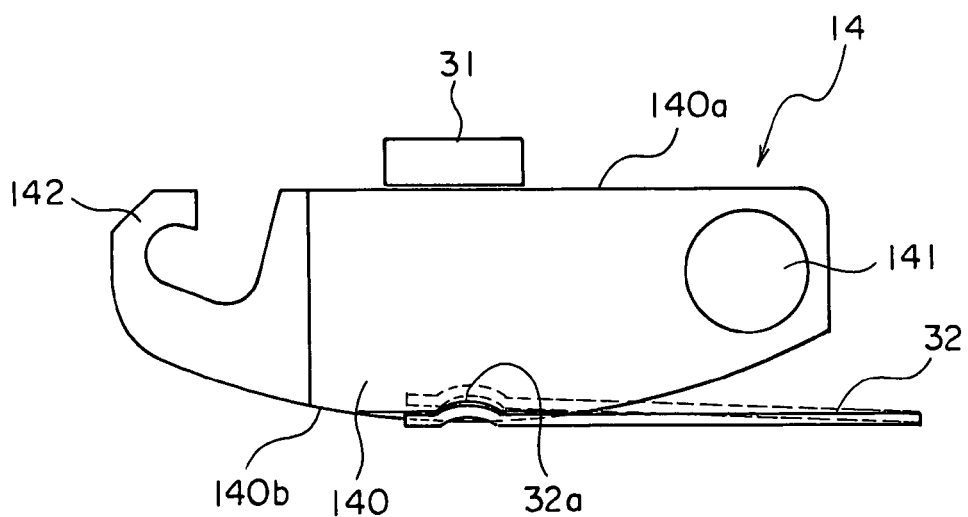
FIG. 5 is a plan view of the grabber illustrated in FIG. 4 with the grabber retained by a retaining member according to an embodiment of this invention.

Referring to FIG. 5 in addition to FIGS. 2-4, the grabber holder (the retaining member) 30 comprises a retainer 31 and a pair of leaf springs 32. The retainer 31 is opposed to the front surface 140a of the grabber body 140 of retaining the grabber 14. The pair of leaf springs 32 is opposed to the retainer 31 with a distance shorter than the thickness of the grabber 14, as shown by a broken line in FIG. 5. In addition, the leaf springs 32 are disposed to be apart from each other in an up and down direction of the grabber 14, as shown in FIG. 3. The pair of leaf springs 32 has a pair of projections 32a engaged with the pair of hollows 140c. A combination of the retainer 31 and the pair of leaf springs 32 serves as a positioning arrangement for fixing the grabber 14 in place.

When the cartridge 20 is loaded in the tape drive 10, the grabber 14 (the pull-out assembly 40) is brought to the reel hub of the take-up reel 11 at the reel hub, in the manner which is described above. In addition, the magnetic tape is wound around the rear surface 140b of the grabber 14 (the pull-out assembly 40). That is, the magnetic tape is wound around a tape winding portion 140d as shown in FIG. 4. Inasmuch as the pair of hollows 140c is disposed the outside of the tape winding portion 140d, the pair of hollows 140c has no effect on tape winding.

Figure 6:
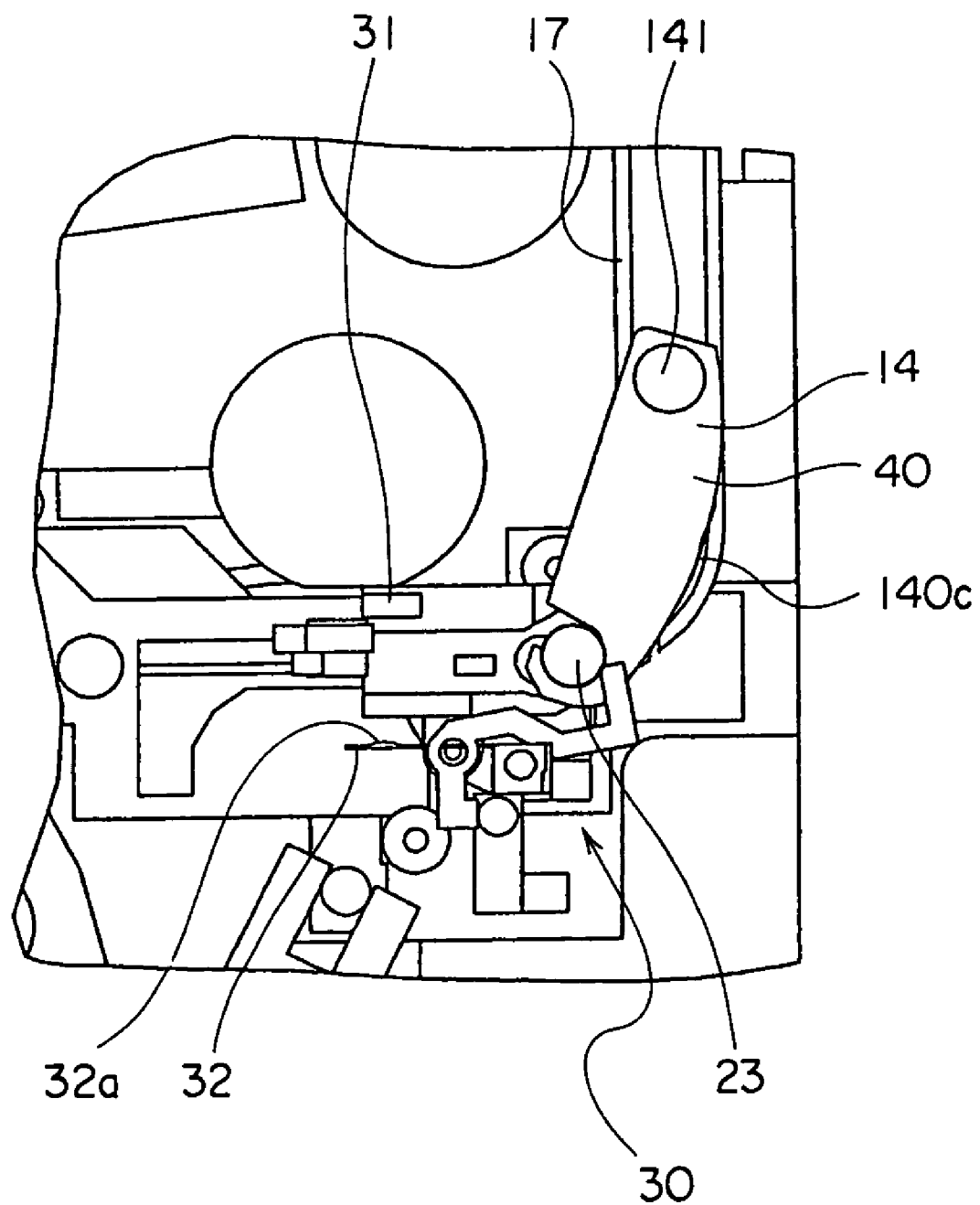
FIG. 6 is a partially enlarged plan view showing a state where the grabber is close to the retaining member.
Figure 7:
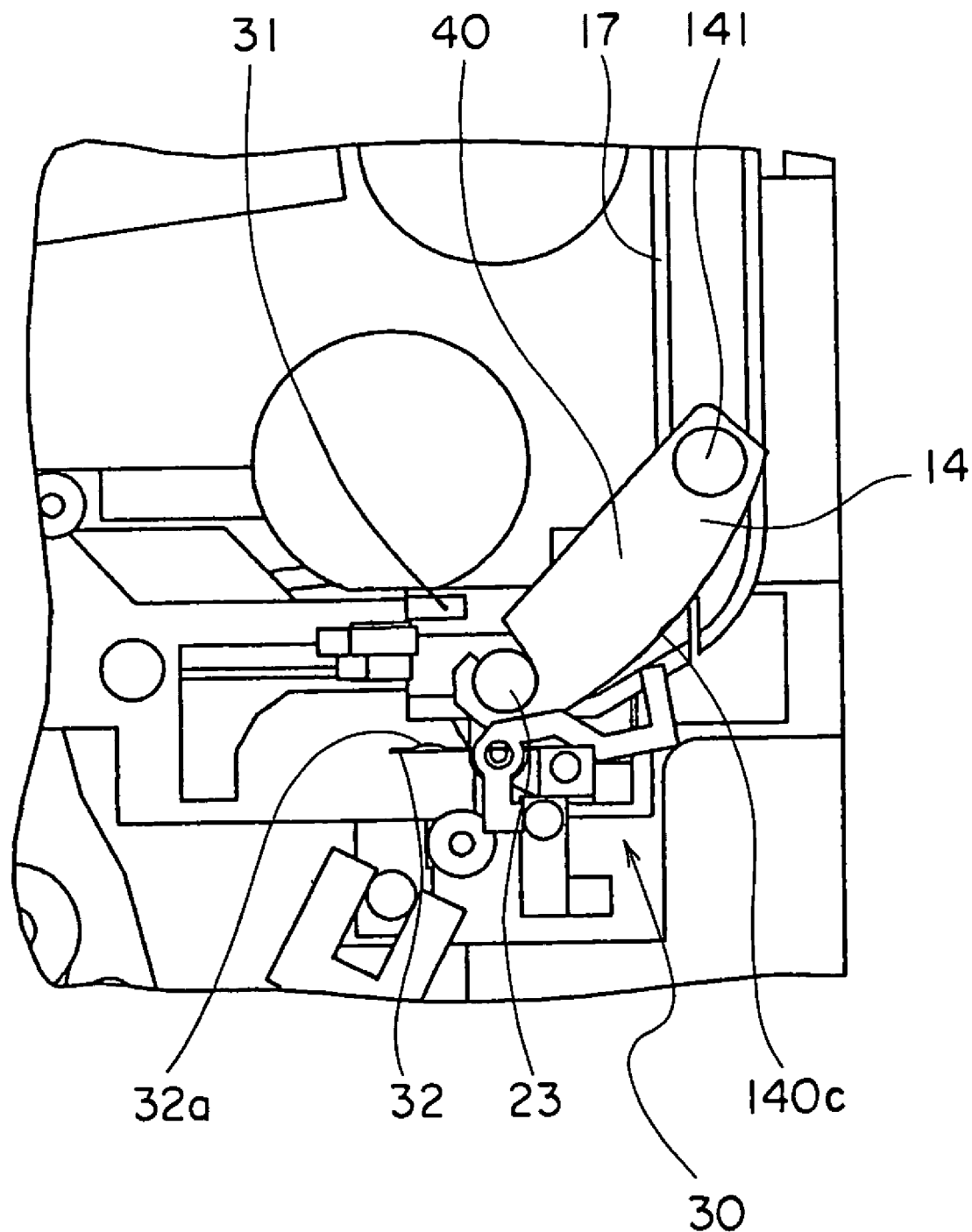
FIG. 7 is a partially enlarged plan view showing a state where the grabber is more close to the retaining member.
Figure 8:
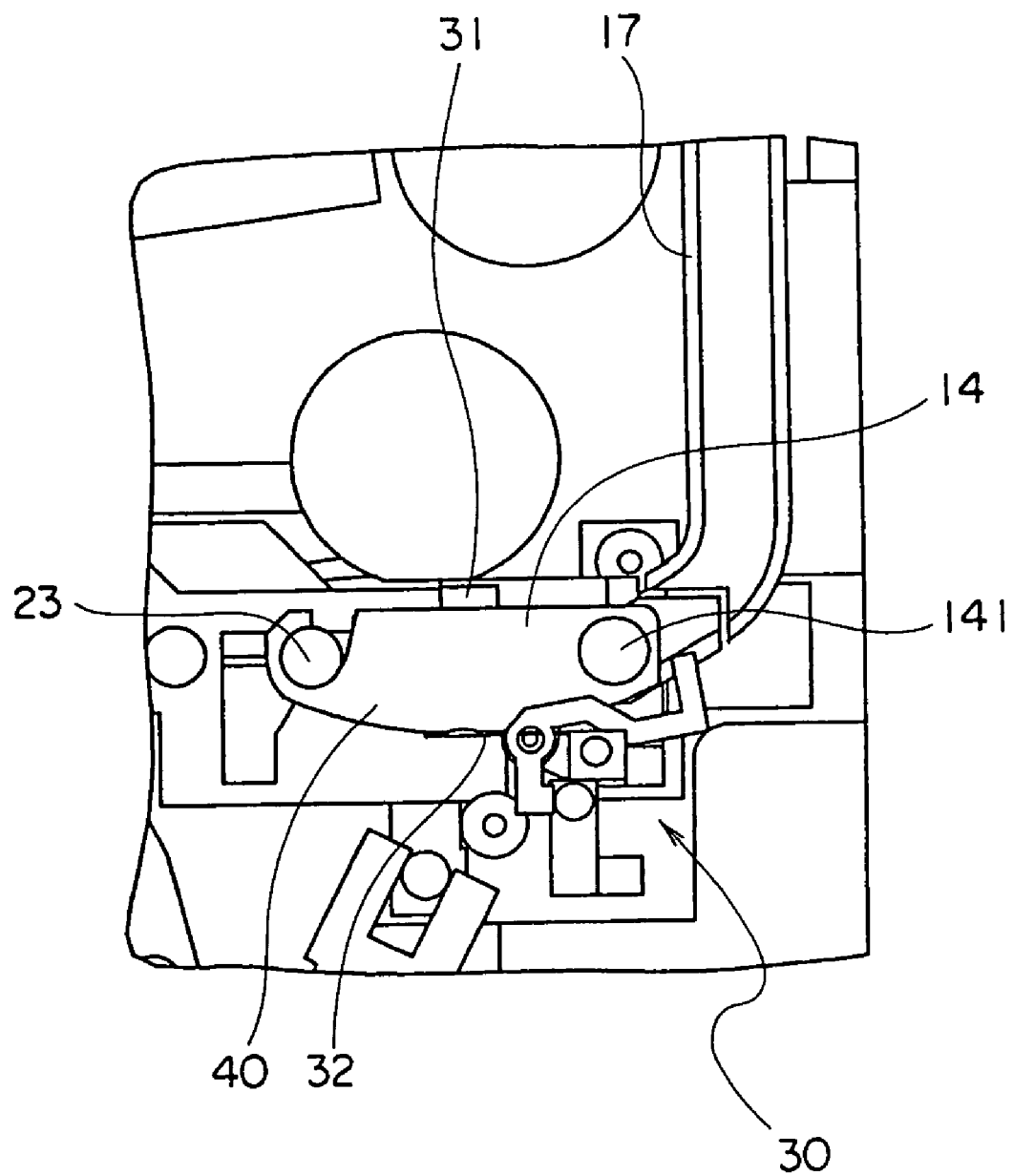
FIG. 8 is a partially enlarged plan view showing a state where the grabber is retained by the retaining member.

Referring now to FIGS. 6 through 8, description will be made as regards operation in a case where the pull-out assembly 40 (the grabber 14) is held in the grabber holder (the retaining member) 30 according to the embodiment of this invention on rewinding the magnetic tape from the take-up reel 11 to the supply reel in the cartridge 20.

By driving the reel motor for rotatably driving the supply reel, the magnetic tape is wound around the reel hub of the supply reel. When rewinding of the magnetic tape draws to a close, the pull-out assembly 40 (the grabber 14) moves along the rails 17 and is gradually close to the grabber holder (the retaining member) 30, as shown in FIGS. 6 and 7.

By continuing to drive the reel motor, the pull-out assembly 40 (the grabber 14) reaches to a position where the pull-out assembly 40 (the grabber 14) is retained in the grabber holder (the retaining member) 30, as shown in FIG. 8. In this event, the grabber 14 enters between the retainer 31 and the pair of leaf springs 32 against an urging force of the pair of leaf springs 32 as shown in FIG. 5 and the projections 32a of the pair of leaf springs 32 are engaged with the pair of hollows 140c of the grabber 14. Therefore, the grabber 14 is retained in the grabber holder (the retaining member) 30 with the grabber 14 fixed to in place. That is, inasmuch as positioning and a retaining force in regard to the grabber 14 are obtained by the retainer 31 and the pair of leaf springs 32, the grabber 14 can be always stood by on the grabber holder (the retaining member) 30 in place. In addition, inasmuch as it is not necessary for the recording and/or reproducing device according to this invention to have latch means different from the retaining means in the conventional recording and/or reproducing device, it is possible to reduce the number of parts, improve reliability, and reduce costs in comparison with the conventional recording and/or reproducing device.

While this invention has thus far been described in conjunction with a preferred embodiment thereof, it is to be understood that modifications will be apparent to those skilled in the art without departing from the spirit of the invention. For example, although a combination of the retainer and the pair of leaf springs is used as the positioning arrangement provided in the retaining member in the above-mentioned embodiment, the positioning arrangement is not restricted to such a structure.

What is claimed is:

1. A recording and/or reproducing device comprising:
a grabber to be coupled to a leader pin, said leader pin being connected to a magnetic tape wound on a reel hub of a supply reel in a cartridge that is adapted to be loaded to the recording and/or reproducing device, and said grabber being connected to a first end of a leader tape which has a second end connected to a reel hub of a take-up reel of the recording and/or reproducing device; and
a retaining member for retaining said grabber when the magnetic tape is rewound from said take-up reel to said supply reel in said cartridge,
wherein said retaining member comprises a positioning arrangement for fixing said grabber in place;
wherein said grabber has a front surface and a rear surface, and the rear surface has a pair of hollows at upper and lower end portions thereof, respectively;
wherein said positioning arrangement comprises:
a retainer which is opposed to the front surface of said grabber when said positioning arrangement retains said grabber; and
a pair of leaf springs which are opposed to said retainer with a distance that is shorter than a thickness of said grabber; and
wherein said leaf springs are disposed to be apart from each other in an up and down direction of the grabber, and said pair of leaf springs comprise a pair of projection that are engageable with the pair of hollows, respectively.

2. The recording and/or reproducing device as claimed in claim 1, wherein said pair of hollows are disposed outside of a tape winding portion where the magnetic tape is wound over the grabber.

* * * * *